(12) United States Patent
Tomandl (10) Patent No.: US 8,215,202 B2
(45) Date of Patent: Jul. 10, 2012

(54) CABLE LENGTH ADJUSTMENT MECHANISM

(75) Inventor: Mark G. Tomandl, Cedar Springs, MI (US)

(73) Assignee: Grand Rapids Controls Company, LLC, Rockford, MI (US)

(*) Notice: Subject to any disclaimer, the term of this patent is extended or adjusted under 35 U.S.C. 154(b) by 967 days.

(21) Appl. No.: 12/139,727

(22) Filed: Jun. 16, 2008

(65) Prior Publication Data

US 2008/0307916 A1 Dec. 18, 2008

Related U.S. Application Data

(60) Provisional application No. 60/944,599, filed on Jun. 18, 2007.

(51) Int. Cl.
*F16C 1/22* (2006.01)
*F16C 1/10* (2006.01)

(52) U.S. Cl. .................. 74/501.5 R; 74/502.4

(58) Field of Classification Search .............. 74/500.5, 74/501.5 R, 502, 501.6, 502.4, 502.6, 526, 74/527, 577 F, 575; 403/105, 107; 188/196 R, 188/196 B
See application file for complete search history.

(56) References Cited

U.S. PATENT DOCUMENTS

| | | | |
|---|---|---|---|
| 1,936,530 A * | 11/1933 | Taylor | 188/196 B |
| 3,587,341 A | 6/1971 | Fiddler | |
| 3,988,943 A | 11/1976 | Orcutt | |
| 4,304,322 A | 12/1981 | Beccaris | |
| 4,331,041 A | 5/1982 | Bennett | |
| 4,464,950 A | 8/1984 | Deligny | |
| 4,610,180 A | 9/1986 | Spease | |
| 4,688,445 A | 8/1987 | Spease et al. | |
| 4,690,262 A | 9/1987 | Hoyle | |
| 4,693,137 A | 9/1987 | Deligny | |
| 4,694,706 A | 9/1987 | Lichtenberg et al. | |
| 4,751,851 A | 6/1988 | Deligny et al. | |
| 4,762,017 A | 8/1988 | Jaksic | |
| 4,787,263 A | 11/1988 | Jaksic | |
| 4,793,206 A | 12/1988 | Suzuki | |
| 4,798,098 A | 1/1989 | Keller et al. | |
| 4,798,100 A * | 1/1989 | Baumgarten | 74/501.5 R |
| 4,799,400 A | 1/1989 | Pickell | |
| 4,841,806 A | 6/1989 | Spease | |
| 4,854,185 A | 8/1989 | Lichtenberg et al. | |
| 4,854,186 A | 8/1989 | Jakob et al. | |
| 4,869,123 A | 9/1989 | Stocker | |
| 4,887,705 A | 12/1989 | Solano et al. | |
| 4,903,541 A | 2/1990 | Shiota | |
| 5,036,725 A | 8/1991 | Troiano | |
| 5,079,967 A | 1/1992 | LaCava | |
| 5,138,897 A | 8/1992 | Beard et al. | |

(Continued)

FOREIGN PATENT DOCUMENTS

WO WO 93/22571 11/1993

*Primary Examiner* — James Pilkington
*Assistant Examiner* — Thomas Diaz
(74) *Attorney, Agent, or Firm* — Price Heneveld LLP (57) ABSTRACT

An automatic cable length adjustment mechanism includes first and second members that slidably engage one another. A spring biases the members apart, and a releasable one-way ratchet-type mechanism interconnects the parts after the parts shift relative to one another to take up slack in a Bowden cable or the like. In a preferred embodiment, the one-way ratchet arrangement includes a plurality of cantilevered levers having teeth or the like that engage rows of teeth.

4 Claims, 8 Drawing Sheets

U.S. PATENT DOCUMENTS

| | | |
|---|---|---|
| 5,142,933 A | 9/1992 | Kelley |
| 5,144,856 A | 9/1992 | Roca |
| 5,156,064 A | 10/1992 | Truman |
| 5,178,034 A | 1/1993 | Reasoner |
| 5,199,321 A | 4/1993 | Nowak |
| 5,220,832 A | 6/1993 | Petruccello |
| 5,261,293 A | 11/1993 | Kelley |
| 5,280,733 A | 1/1994 | Reasoner |
| 5,394,770 A | 3/1995 | Boike et al. |
| 5,398,566 A | 3/1995 | Moore |
| 5,435,202 A | 7/1995 | Kitamura |
| 5,485,762 A | 1/1996 | Rothman |
| 5,489,011 A | 2/1996 | Reed, Jr. et al. |
| 5,544,543 A | 8/1996 | Hilgert et al. |
| 5,553,818 A | 9/1996 | Wild |
| 5,560,261 A | 10/1996 | Kitamura |
| 5,564,314 A | 10/1996 | Gabas |
| 5,571,237 A | 11/1996 | Lu et al. |
| 5,584,212 A | 12/1996 | Wild |
| 5,588,334 A | 12/1996 | Lu et al. |
| 5,598,743 A | 2/1997 | Yasuda |
| 5,653,148 A * | 8/1997 | Reasoner .................... 74/502.4 |
| 5,655,415 A | 8/1997 | Nagle et al. |
| 5,664,461 A | 9/1997 | Kitamura |
| 5,682,797 A | 11/1997 | Kelley et al. |
| 5,706,706 A | 1/1998 | Kitamura |
| 5,709,132 A | 1/1998 | Irish et al. |
| 5,724,858 A | 3/1998 | Polando |
| 5,746,094 A | 5/1998 | Medebach et al. |
| 5,823,063 A | 10/1998 | Nagle et al. |
| 5,839,325 A | 11/1998 | Castellon |
| 5,842,382 A | 12/1998 | Gabas |
| 5,842,552 A | 12/1998 | Colber, Jr. et al. |
| 5,850,763 A | 12/1998 | Kitamura |
| 5,868,038 A | 2/1999 | Bravo |
| 5,921,143 A | 7/1999 | Castillo et al. |
| 5,934,150 A | 8/1999 | Srinivas et al. |
| 6,003,403 A | 12/1999 | Klippert et al. |
| 6,023,992 A | 2/2000 | Cameno |
| 6,085,610 A | 7/2000 | Gabas et al. |
| 6,093,892 A | 7/2000 | Arimoto |
| 6,116,111 A | 9/2000 | Bürger |
| 6,131,482 A | 10/2000 | Klippert et al. |
| 6,178,845 B1 * | 1/2001 | Gutschner .................... 74/502.4 |
| 6,216,555 B1 | 4/2001 | Malone |
| 6,263,756 B1 | 7/2001 | Gabas et al. |
| 6,511,044 B2 | 1/2003 | Kottke et al. |
| 6,595,080 B2 | 7/2003 | Waldow et al. |
| 6,698,967 B2 | 3/2004 | Henrich et al. |

* cited by examiner

CABLE LENGTH ADJUSTMENT MECHANISM

CROSS-REFERENCE TO RELATED APPLICATION

This application claims the benefit of U.S. Provisional Application No. 60/944,599, filed on Jun. 18, 2007, entitled CABLE LENGTH ADJUSTMENT MECHANISM, the entire contents of which are incorporated herein by reference.

BACKGROUND OF THE INVENTION

Cables have been widely used for control and/or adjustment and/or actuation of various mechanisms and devices. One type of cable utilized for such applications is known as a "Bowden" cable having an outer sheath and an inner cable. In general, such cables transfer force/movement from a lever, knob, or other manually-activated user input device to a remote mechanism or device to actuate the mechanism or device. Such cables have been used for adjusting components of vehicle seats, office chairs, and the like. Such cables may also be utilized to actuate devices in a vehicle such as latch releases for vehicle hoods, trunks, and the like, door components, heating/cooling components, engine components, or the like.

During assembly, the length of the cable may need to be adjusted to accommodate variations in the dimensions of the various components to which the cable is attached. Although various attempts to address the cable length adjustment issue have been made, known adjustment mechanisms may be somewhat time consuming and difficult to use. Furthermore, known cable adjustment mechanisms may not reliably provide the degree of adjustment desired.

Accordingly, a cable adjustment device alleviating the drawbacks of known devices would be desirable.

BRIEF DESCRIPTION OF THE DRAWINGS

FIG. 5;

FIG. 9;

DETAILED DESCRIPTION OF PREFERRED EMBODIMENT

Figure 1:
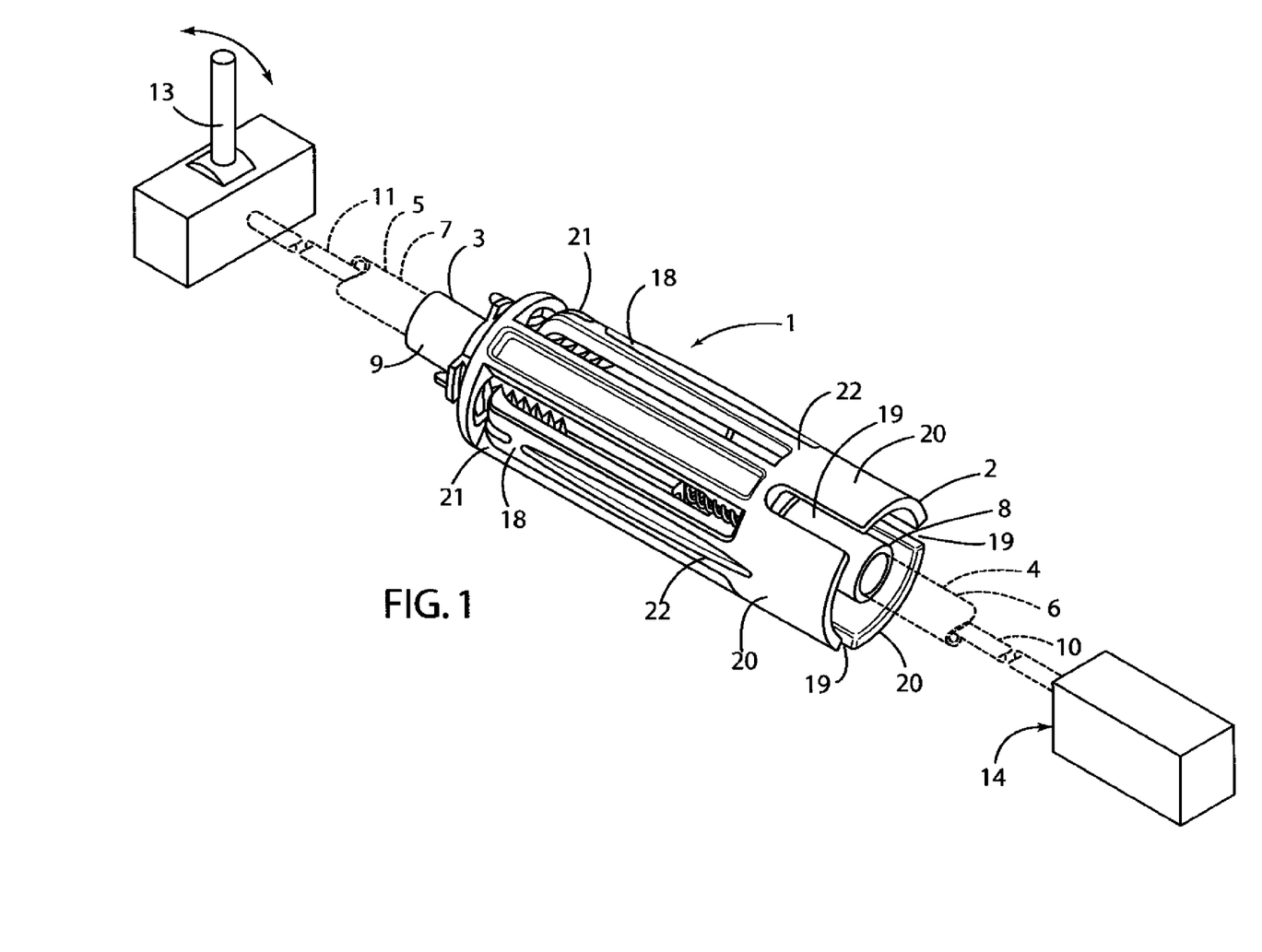
FIG. 1 is a partially schematic isometric view of a cable adjustment device according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts. Hence, specific dimensions and other physical characteristics relating to the embodiments disclosed herein are not to be considered as limiting.

Figure 2:
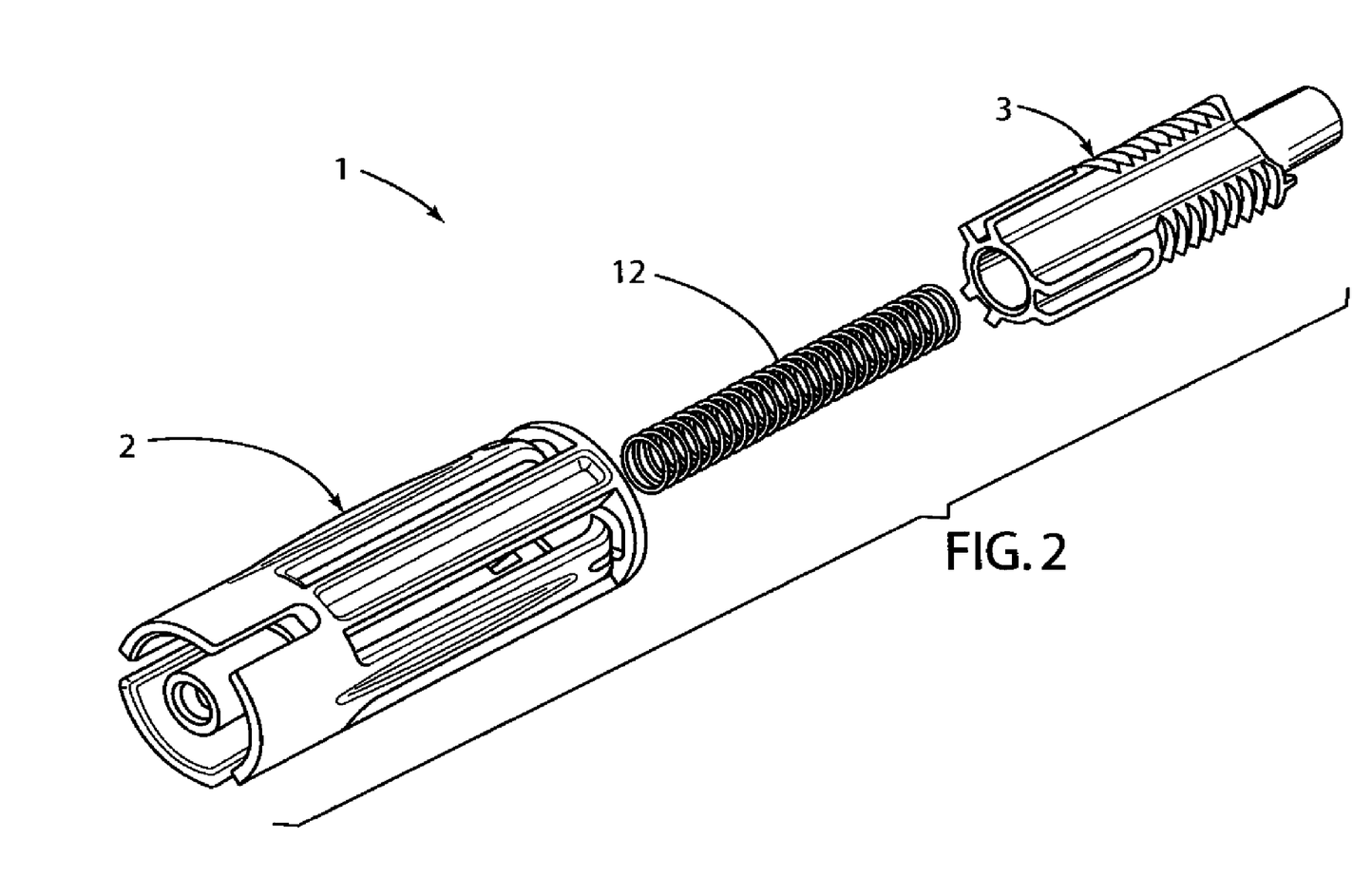
FIG. 2 is an exploded isometric view of the cable adjustment mechanism of FIG. 1.
Figure 3:
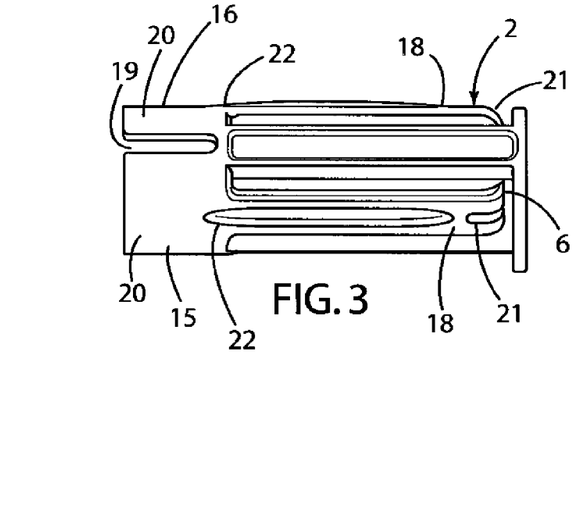
FIG. 3 is a side elevational view of a component of the cable adjustment mechanism of FIG. 1.
Figure 4:
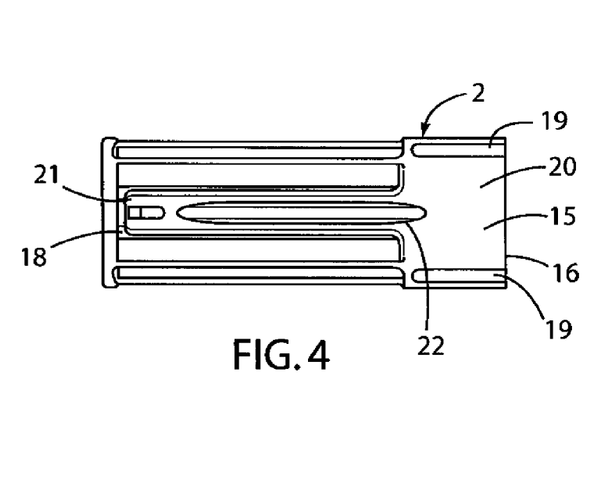
FIG. 4 is a top elevational view of the component of FIG. 3.
Figure 5:
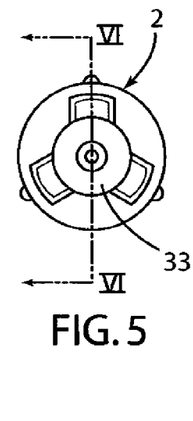
FIG. 5 is an end view of the component of FIG. 3.
Figure 6:
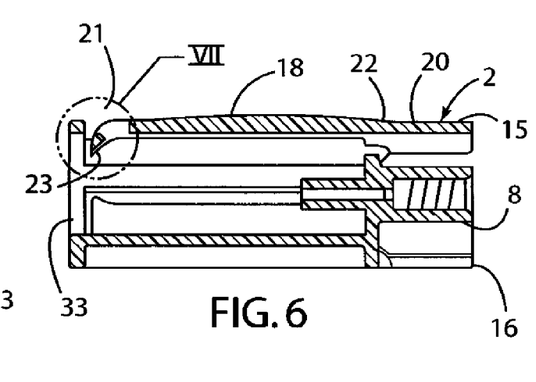
FIG. 6 is a cross-sectional view of the component of FIG. 3 taken along the line VI-VI.
Figure 7:
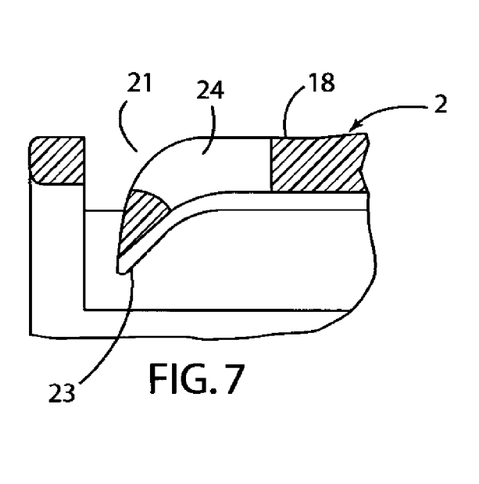
FIG. 7 is an enlarged view of a portion of the mechanism of FIG. 6.

With reference to FIGS. 1 and 2, a cable length adjustment mechanism 1 according to the present invention includes a jacket 2 and a slide 3 that engage one another when assembled as shown in FIG. 1 to provide for length adjustment of a Bowden cable having a first section 4 and a second section 5. The Bowden cables mechanically interconnect a user input device such as a lever 13 and a device or mechanism 14. The Bowden cables 4 and 5 have outer sheaths 6 and 7, respectively that engage fitting portions 8 and 9 of jacket 2 and slide 3, respectively. The Bowden cables also include inner cable members 10 and 11, respectively that move relative to the outer sheaths 6 and 7, respectively in use. As discussed in more detail below, a spring 12 (FIG. 2) biases the jacket 2 away from the slide 3, and thereby selectively takes up slack in the Bowden cable sections 4 and 5 when the Bowden cable is used to actuate a mechanism, device, or the like.

Figure 8:
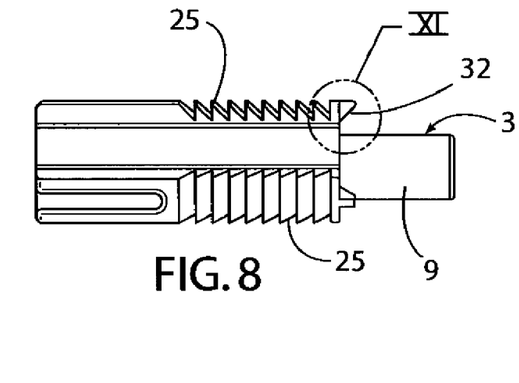
FIG. 8 is a front elevational view of another component of the device of FIG. 1.
Figure 9:
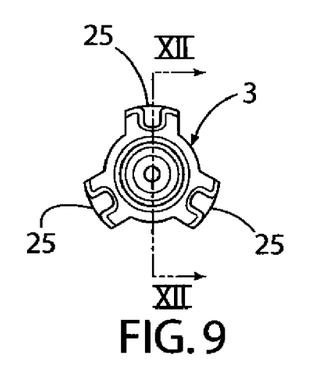
FIG. 9 is an end view of the component of FIG. 8.
Figure 10:
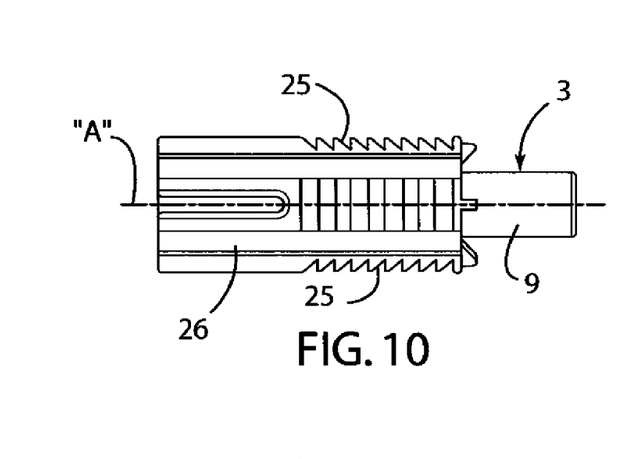
FIG. 10 is a top elevational view of the component of FIG. 8.
Figure 11:
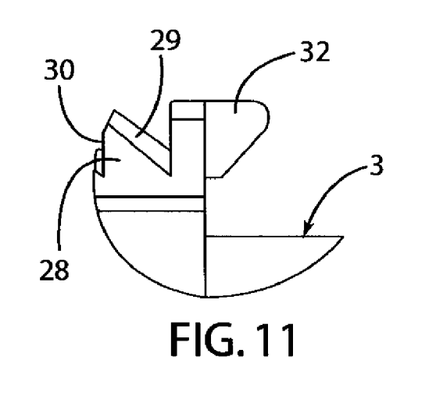
FIG. 11 is an enlarged fragmentary view of a portion of the mechanism of FIG. 8.
Figure 12:
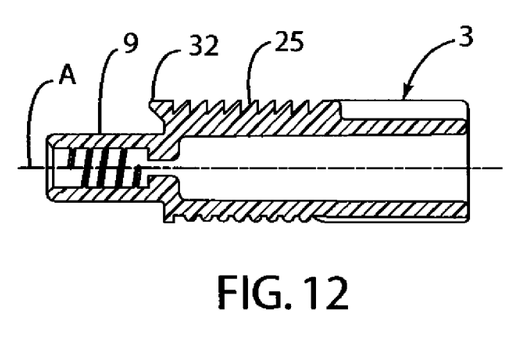
FIG. 12 is a cross-sectional view of the component of FIG. 9 taken along the line XII-XII.

With further reference to FIGS. 3-7, jacket 2 includes a collar portion 15 at a first end 16, and a plurality of integrally-formed fingers or levers 18 extending from the collar portion 15 in a cantilevered manner. A plurality of slots 19 in collar portion 15 form tab portions 20. As described in more detail below, ends 21 of levers 18 can be moved outwardly by applying inwardly-directed forces on tab portions 20 causing the levers 15 flex about base portions 22 of levers 18. The levers 18 are shown in their free/unflexed state or position in FIGS. 3-7. The jacket 2 is made of a resilient polymer material such that the levers 18 will tend to return to the free position in the absence of external forces. As also described in more detail below, each lever 18 includes a point or tooth 23 that selectively engages a row of teeth 25 (FIG. 8) in slide 3 to control/restrict movement of jacket 2 relative to slide 3.

With further reference to FIGS. 8-12, slide 3 includes a body portion 26 having three rows of teeth 25 extending along the body portion 26. Each tooth 28 (FIG. 11) includes an angled first surface 29, and a second surface 30 that extends at approximately a ninety degree angle relative to axis "A" (FIGS. 10 and 12) of slide 3. As discussed in more detail below, the points or teeth 23 at ends 21 of levers 18 of jacket 2 selectively engage the surfaces 29 and 30 of teeth 28. A protrusion 32 at the end of each row 25 of teeth may be received in an opening 24 (FIG. 7) at ends 21 of levers 18.

Figure 13:
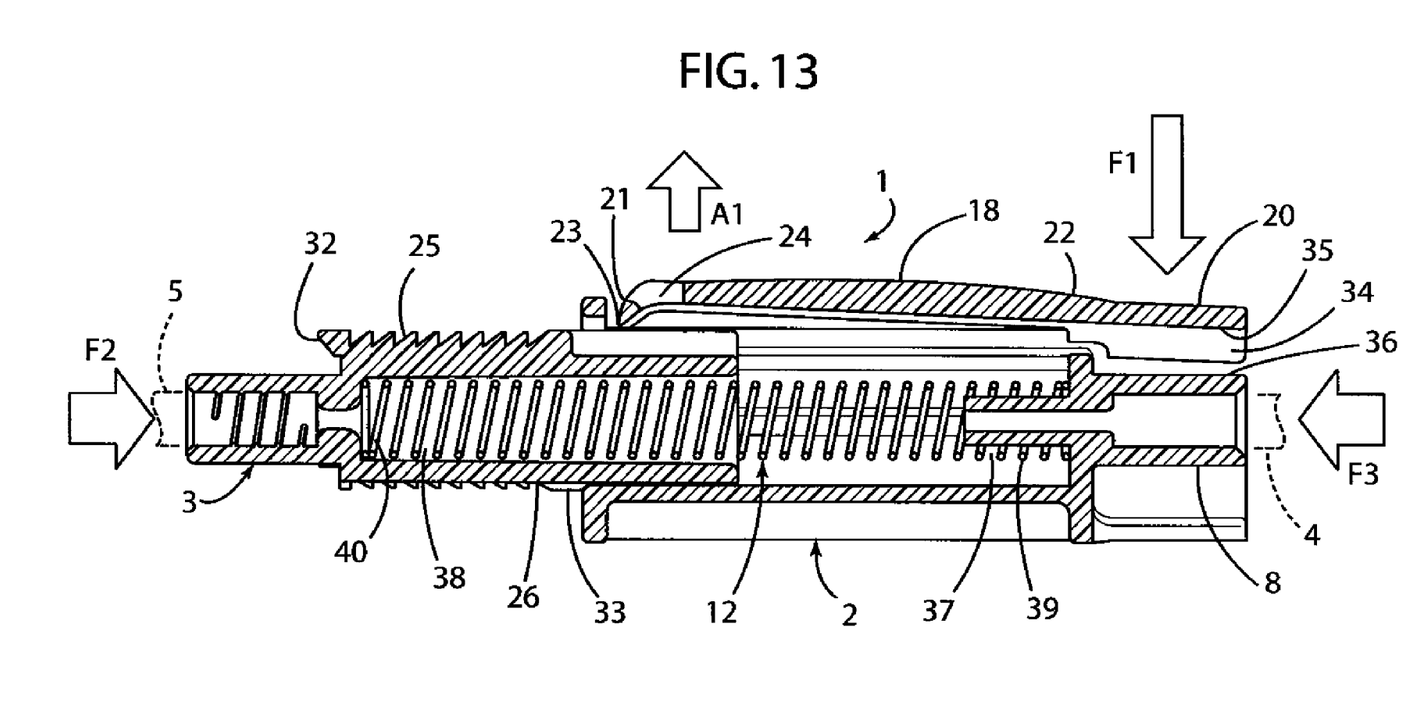
FIG. 13 is a cross-sectional view of the mechanism during assembly.

Further reference to FIG. 13, during assembly of cable length adjustment mechanism 1, first Bowden cable section 4 is connected to jacket 2, and second Bowden cable section 5 is attached to slide 3. Inwardly-directed forces F1 are applied to tab portions 20 thereby causing the levers 18 to pivot about base portions 22, thereby shifting ends 21 of levers 18 outwardly in the direction of the arrow "A1" away from the rows of teeth 25 of side 3. Body portion 26 of slide 3 is then slid into opening 33 of jacket 2 by application of external forces force "F2" and "F3". The forces F2 and F3 cause spring 12 to be compressed, such that spring 12 generates axial forces opposite forces F2 and F3 tending to cause jacket 2 and slide 3 to move axially relative to one another in directions opposite arrows F2 and F3. When the lever members 18 are in the position illustrated in FIG. 13, the points or teeth 23 are shifted outwardly, such that they do not engage the rows of teeth 25 of slide 3 as the slide 3 is inserted into jacket 2. Also, as shown in FIG. 13, an inwardly-extending extension 34 on inner side 35 of tab portion 20 may engage outer surface 36 of fitting portion 8 to prevent flexing/movement of lever members 18 beyond the amount required to provide clearance between points or teeth 23 of levers 18 and rows of teeth 25 of slide 3. As shown in FIG. 13, when cable length adjustment mechanism 1 is assembled, spring 12 is received over a cylindrical extension 37 of jacket 2 to thereby retain end 39 of spring 12, and an opposite end 40 of spring 12 is received in a cylindrical cavity 38 of slide 3 to retain and locate end 40 of spring 12 relative to slide 3. Spring 12 biases the jacket 2 and slide 3 away from one another in an axial direction opposite the arrows F2 and F3.

Figure 14:
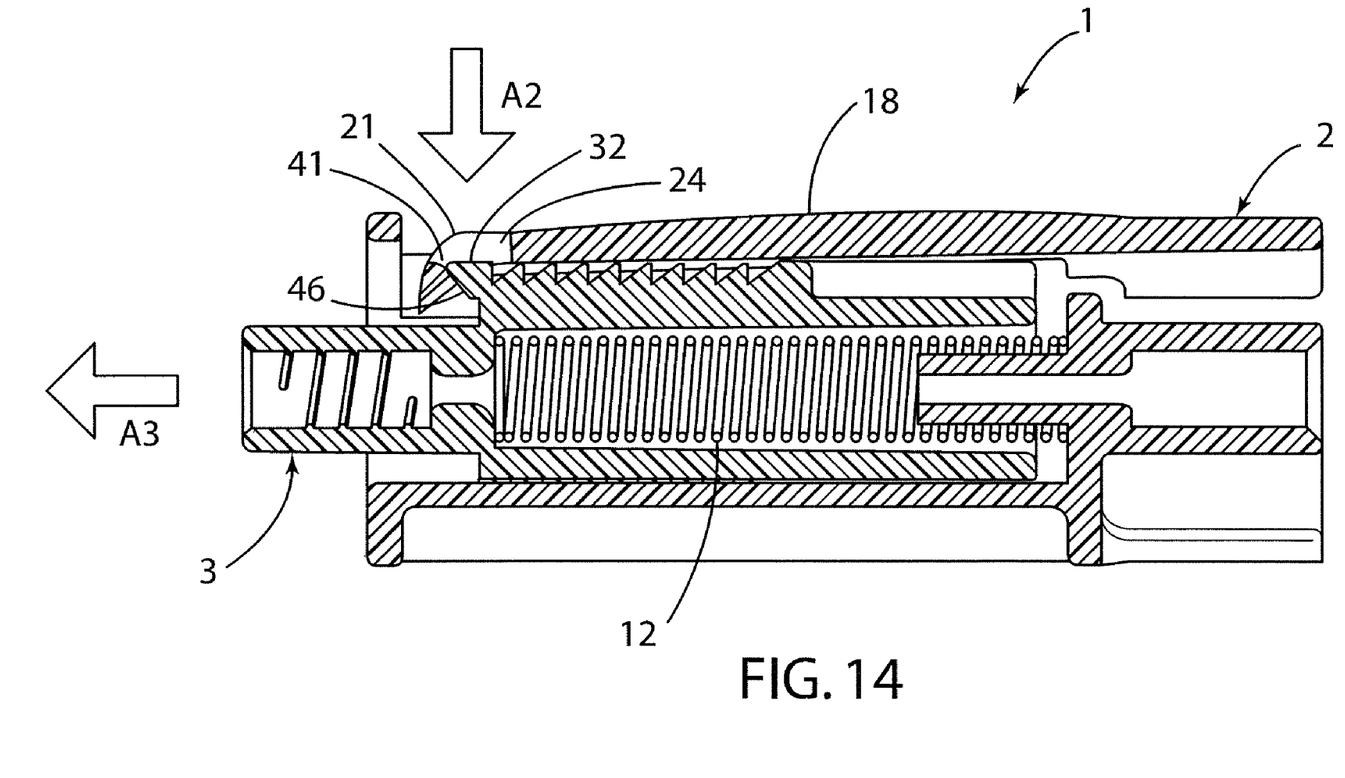
FIG. 14 is a cross-sectional view of the mechanism of FIG. 13 illustrating the components in a locked state, ready for installation.

With further reference to FIG. 14, after slide 3 is fully inserted into jacket 2, the external force F1 (FIG. 13) is removed, and ends 21 of levers 18 are pushed inwardly in the direction of the arrow A2 (FIG. 14). Spring 12 then causes slide 3 to shift slightly in the direction of the arrow A3 relative to jacket 2 when forces F2 and F3 (FIG. 13) are released. As the ends 21 of levers 18 shift to the position illustrated in FIG. 14, first lock surface 46 of protrusions 32 of slide 3 are received in openings 24 at ends 21 of levers 18. As the slide 3 shifts axially/outwardly in the direction of the arrow A3 due to spring 12, first lock surface 46 of protrusion 32 of slide 3 contacts second lock surface 41 of opening 24, thereby preventing further movement of slide 3 relative to jacket 2. Also, due to the angle of surface 46 of protrusion 32 and surface 41, contact between surface 46 of protrusion 32 and surface 41 also generates a force tending to move ends 21 of levers 18 in the direction of arrow A2. The engagement of surface 46 of protrusion 32 in opening 24 thereby retains the jacket 2 and slide 3 in the position illustrated in FIG. 14.

Figure 15:
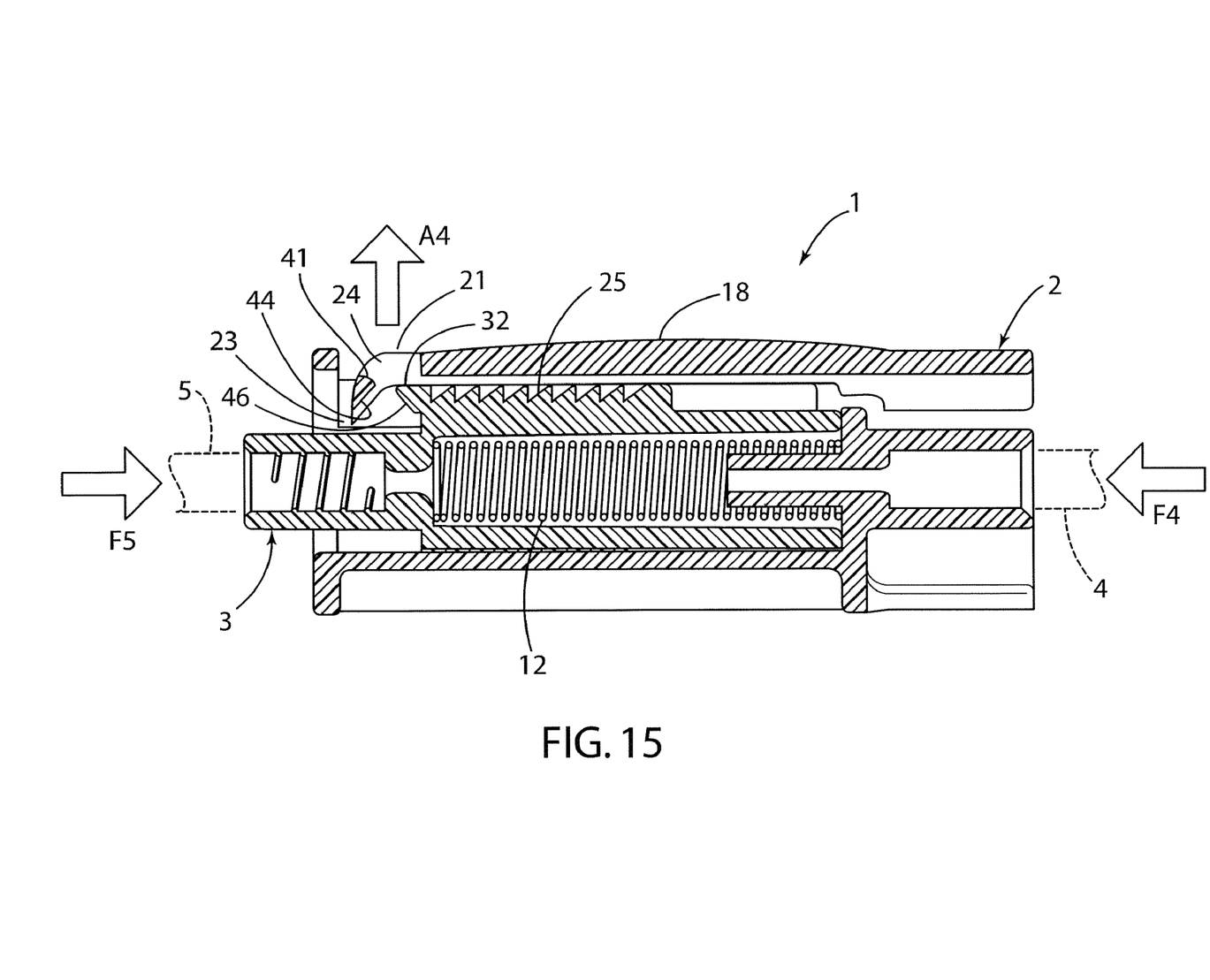
FIG. 15 is a cross-sectional view of the mechanism showing the effects of axially compressed applied forces activating the assembly to provide "automatic" adjustment.
Figure 16:
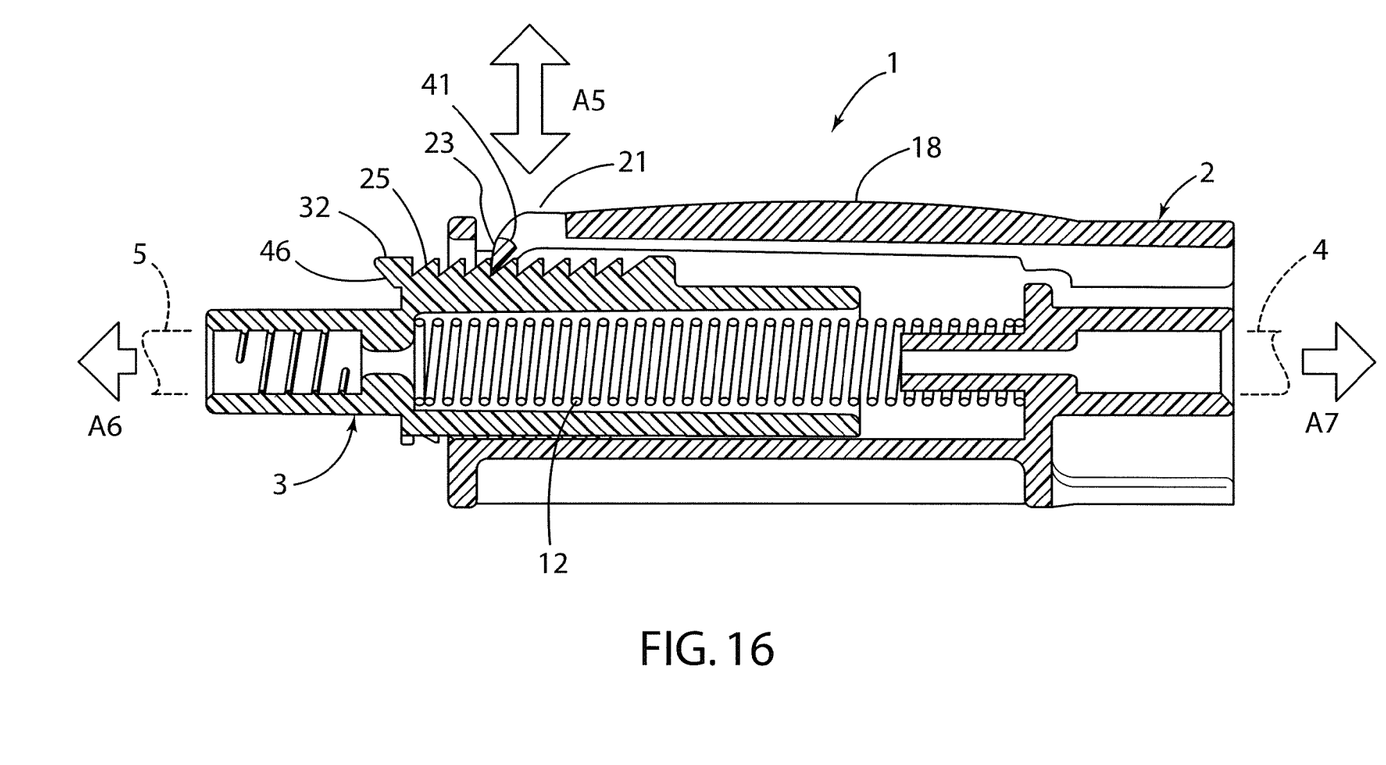
FIG. 16 is a cross-sectional view of the mechanism in the adjusted state.

With further reference to FIG. 15, during the first actuation of a mechanism 14 (FIG. 1), the mechanism adjusts automatically to account for variations in the dimensions of the various components. During the first actuation, the Bowden cable sections 4 and 5 generate compressive axial forces F4 and F5 acting on the jacket 2 and slide 3, respectively. The axial forces F4 and F5 are sufficiently strong to overcome the bias due to spring 12, causing the jacket 2 and slide 3 to shift slightly relative to one another, thereby disengaging protrusion 32 of slide 3 from opening 24 at end 21 of levers 18. The levers 18 then shift to the position illustrated in FIG. 15. The position of the levers 18 shown in FIG. 15 is the free or neutral position that the levers 18 assume if no forces are applied to the levers 18. As the external forces F4 and F5 are released, spring 12 moves the slide 3 out of jacket 2, causing protrusion 32 of slide 3 to contact inner surface 44 at end 21 of lever 18. As the protrusion 32 slides along angled inner surface 44 due to the force generated by spring 12, ends 21 of levers 18 shift outwardly in the direction of the arrow A4. With further reference to FIG. 16, as the slide 3 continues to move axially outwardly relative to jacket 2, the points or teeth 23 at the ends 21 of levers 18 engage the rows of teeth 25. As the point or tooth 23 at end 21 of levers 18 slides over the teeth 25, the end 21 of lever 18 shifts back and forth outwardly due to the ratcheting-type action generated by the angled teeth surfaces 29 and 30 (see also FIG. 11). The configuration of the point or tooth 23 and teeth 25 thereby forms a one-way ratchet-type mechanism that permits the jacket 2 and slide 3 to shift axially outward relative to one another in the directions of the arrows A6 and A7, respectively, but prevents movement of jacket 2 relative to slide 3 in the directions opposite arrows A6 and A7. In use, the force generated by spring 12 pushes the slide 3 and jacket 2 apart in the direction of the arrows A6 and A7, respectively, until any slack in the cable sections 4 and 5, respectively, is removed.

After the mechanism 14 has adjusted as required for a particular installation, the position of jacket 2 relative to slide 3 will normally remain the same. If, however, slack develops in the Bowden cable assembly the spring 12 will move slide 3 to eliminate the slack as needed. Also, levers 18 may be configured to flex outwardly if a predetermined excessive force is applied to the Bowden cable and the mechanism 14 without disengaging from teeth 25. This prevents damage to the Bowden cable sheath or cable.

The jacket 2 and slide 3 may be formed of molded polymer material or other suitable materials as required for a particular application.

The cable length adjustment mechanism 1 of the present invention provides a very quick and easy-to-assemble mechanism that automatically takes up slack in Bowden cables and the like during the first actuation of a mechanism controlled by the Bowden cable.

In the foregoing description, it will be readily appreciated by those skilled in the art that modifications may be made to the invention without departing from the concepts disclosed herein.

The invention claimed is:

1. A cable adjustment mechanism for cables of the type having an elongated inner member and a sheath extending along an axis, the cable adjustment mechanism comprising:
 a jacket member having a base portion and a plurality of flexible fingers extending from the base portion in a first direction in a cantilevered manner to define end portions that are movable inwardly and outwardly relative to the axis upon flexing of the fingers, each finger including at least one tooth at the end portion, wherein the tooth of each finger forms a distal end of the finger extending inwardly towards the axis; and wherein each finger includes a first locking surface that extends at an angle relative to the axis and faces outwardly away from the axis; and wherein the first locking surfaces are formed by openings through the fingers adjacent the distal ends;
 a slide member movably engaging the jacket member such that the jacket member and the slide member can be moved relative to another to define extended and retracted configurations of the cable adjustment mechanism, the slide member including rows of teeth and second locking surfaces that face inwardly towards the axis;
 a resilient member biasing the jacket member and the slide member towards the extended position; and wherein:
 the first and second locking surfaces engage one another when the jacket member and the slide member are in the retracted position and the end portions of the flexible fingers are in a first position relative to the slide member and substantially prevent movement of the jacket member and the slide member to the extended configuration;
 the teeth of the flexible fingers engaging the rows of teeth when the jacket member and the slide member are in intermediate configurations between the extended and retracted configurations and forming a ratchet that permits relative movement of the jacket member and the slide member towards the extended configuration, yet substantially preventing movement of the jacket member and the slide member towards the retracted configuration;

the first locking surface extends at an angle relative to the axis and faces outwardly away from the axis.

2. The cable adjustment mechanism of claim 1, wherein: the second locking surfaces are formed by extensions adjacent first ends of each row of teeth.

3. A cable adjustment mechanism for cables of the type having an elongated inner member and a sheath extending along an axis, the cable adjustment mechanism comprising:

a jacket member having a base portion and a plurality of flexible fingers extending from the base portion in a first direction in a cantilevered manner to define end portions that are movable inwardly and outwardly relative to the axis upon flexing of the fingers the flexible fingers defining a non-flexed configuration wherein the end portions are located in an intermediate position, each finger including at least one tooth at the end portion and a first locking surface;

a slide member movably engaging the jacket member such that the jacket member and the slide member can be moved relative to another to define extended and retracted configurations of the cable adjustment mechanism, the slide member including rows of teeth and second locking surfaces;

a resilient member biasing the jacket member and the slide member towards the extended position and generating a force tending to cause the first and second locking surfaces to engage one another when the cable adjustment mechanism is in the retracted position ; wherein the force of the resilient member causes the first and second locking surfaces to contact one another and generate a force tending to cause the end portions of the flexible fingers to move inwardly towards the axis; and wherein:

the first and second locking surfaces engage one another when the jacket member and the slide member are in the retracted position and the end portions of the flexible fingers are in a first position relative to the slide member and substantially prevent movement of the jacket member and the slide member to the extended configuration;

the teeth of the flexible fingers engaging the rows of teeth when the jacket member and the slide member are in intermediate configurations between the extended and retracted configurations and forming a ratchet that permits relative movement of the jacket member and the slide member towards the extended configuration, yet substantially preventing movement of the jacket member and the slide member towards the retracted configuration and wherein:

the end portions of the flexible fingers are positioned inwardly of the intermediate position when the first and second locking surfaces are in contact with one another and no external forces are applied to the cable adjustment mechanism.

4. A cable adjustment mechanism of the type that takes up slack in Bowden cables, the adjustment mechanism comprising:

a jacket member defining an axis and having a base portion and a lever defining an engagement portion that is movable transverse to the axis relative to the base portion, the engagement portion defining a tooth portion and a first locking surface, the jacket member further including a first fitting portion configured to connect to an outer sleeve of a Bowden cable;

a slide member movably engaging the jacket member for movement along the axis relative to the jacket member, the slide member having a second fitting portion configured to connect to an outer sleeve of a Bowden cable wherein the first and second fitting portions are paced apart to define a length, the slide member having a row of teeth configured to selectively engage the tooth portion of the jacket member to form a ratchet structure, the slide member further defining a second locking surface that selectively engages the first locking surface to substantially prevent movement of the slide member relative to the jacket member in a manner that would otherwise cause a magnitude of the length to increase, wherein the tooth portion is disengaged from the row of teeth when the second locking surface simultaneously engages the first locking surface;

a spring biasing the jacket member and the slide member in a manner tending to cause a magnitude of the length to increase; and wherein:

the ratchet structure defines an engaged configuration wherein the tooth portion engages the row of teeth whereby the ratchet structure permits movement of the jacket member and slide member relative to one another such that a magnitude of the length increases when the ratchet structure is in the engaged configuration, the ratchet structure substantially preventing movement of the jacket member and slide member relative to one another such that a magnitude of the length decreases when the ratchet structure is in the engaged configuration, the ratchet structure further defining a disengaged configuration wherein the tooth portion is disengaged from the row of teeth and the ratchet structure permits movement of the jacket member and slide member relative to one another such that the magnitude of the length decreases;

the first locking surface is formed by an opening through the engagement portion of the lever.

* * * * *